United States Patent [19]

Kubo

[11] Patent Number: 4,495,003
[45] Date of Patent: Jan. 22, 1985

[54] MANUFACTURING A STEEL TUBE INCLUDING TUFFTRIDING

[75] Inventor: Naomi Kubo, Nagoya, Japan

[73] Assignee: Usui Kokusai Sangyo Kabushiki Kaisha, Sunto, Japan

[21] Appl. No.: 456,982

[22] Filed: Jan. 10, 1983

Related U.S. Application Data

[62] Division of Ser. No. 383,788, Jun. 1, 1982, Pat. No. 4,458,724.

[30] Foreign Application Priority Data

Jun. 8, 1981 [JP] Japan ............................ 56-87868

[51] Int. Cl.³ .............................................. B32B 15/00
[52] U.S. Cl. .................................... 148/15.5; 148/39; 138/143
[58] Field of Search ................. 148/15.5, 39; 138/143

[56] References Cited

U.S. PATENT DOCUMENTS

| | | | |
|---|---|---|---|
| 2,541,116 | 2/1951 | Somes | 148/39 |
| 3,208,885 | 9/1965 | Muller | 148/15.5 |
| 4,261,769 | 4/1981 | Usni | 148/39 |
| 4,346,739 | 8/1982 | Asada | 138/143 |

OTHER PUBLICATIONS

*Metals Handbook*, vol. 2, 8th Ed., Amer. Soc. Metals, Metals Park, Oh., pp. 146-151, 1974.

Frank Smith, Metals (Australia) Tufftride-Its Metallurgy Application and Evaluation, pp. 147-152, Jun. 1970.

SAE Testing Stands for Diesel Fuel Injection Systems-SAE J970a pp. 24,104-24,109 and SAE J521b-Fuel Injection Tubing Connections.

*Primary Examiner*—Veronica O'Keefe
*Attorney, Agent, or Firm*—Anthony J. Casella; Gerald E. Hespos

[57] ABSTRACT

A steel tube having a small outside diameter and a large wall thickness, for use, for example, as a high pressure fuel injection pipe for a diesel engine, has a hardened layer on at least its internal surface. The hardened layer is formed by a diffusion layer which comprises a solid solution of nitrogen formed by tufftriding, and which is completely free from any intermetallic compounds, i.e. $Fe_3N$ and $Fe_4N$. A method of manufacturing such a tube is also disclosed, and comprises tufftriding a steel tube in a molten bath of sodium cyanide while it is being axially vibrated, to form the diffusion layer, and heat treating the tube in a gaseous atmosphere to decompose any intermetallic compound on the diffusion layer.

4 Claims, 4 Drawing Figures

F I G. 1
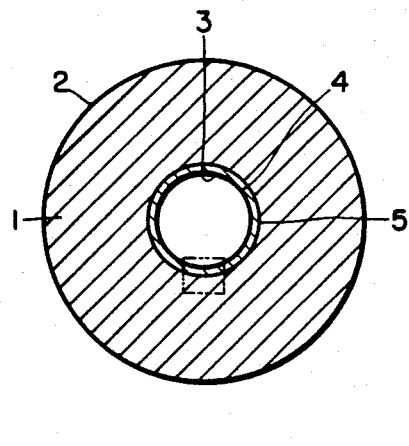
F I G. 2
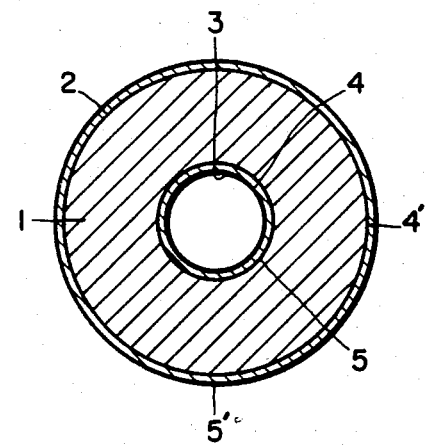
F I G. 3
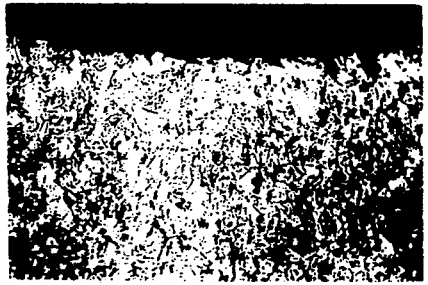
F I G. 4
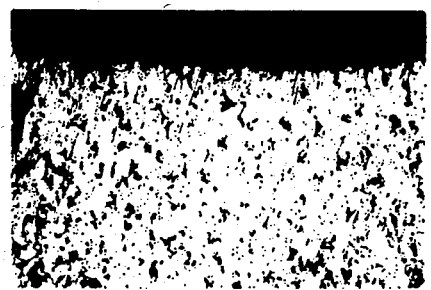

MANUFACTURING A STEEL TUBE INCLUDING TUFFTRIDING

This is a division of application Ser. No. 383,788 filed June 1, 1982, now U.S. Pat. No. 4,458,724.

This invention relates to a steel tube, more particularly a tube having a relatively small outside diameter and a large wall thickness, and a hardened layer on at least one surface thereof. This invention also relates to a method of manufacturing such a tube. Steel tube of this kind, typically, having an outside diameter of, say, 6.0 to 15.0 mm and a wall thickness of, say, 2.2 to 5.5 mm, is used to form high pressure fuel injection pipes for diesel engines.

It has been usual to manufacture, for example, high pressure fuel injection pipes for diesel engines by repeatedly heating and drawing tubular carbon steel stock to the desired dimensions. A high pressure fuel injection pipe of the type specified in SAE J970a - Test for Diesel Fuel Injection Systems and SAE J521b - Fuel Injection Tubing Connections, has substantially uniform mechanical properties across its final wall thickness, i.e. a hardness of, say, Hv 110 to 120 a yield point of, say, 27 to 30 kg/mm$^2$ and a tensile strength of, say, 34 to 37 kg/mm$^2$. Since a high fluid pressure prevails in the pipe, and changes frequently, and since the pipe is subject to heavy vibration, its internal surface is likely to become uneven by cavitation erosion. Moreover, conventional pipes tend to exhibit unsatisfactory fatigue strength, and are often likely to crack or break when subject to repeated vibration.

It has, therefore, been proposed that a hardened layer be formed on the internal surface of the tube by gas soft-nitriding or carburizing, or otherwise. It is, however, difficult to fill a tube saving a small internal diameter with a gas uniformly along its entire length with the result that the hardened layer tends to lack uniformity.

One object of this invention is to provide an improved steel tube having a small outside diameter and a large wall thickness, and a hardened layer on at least one of its surfaces.

According to this invention we propose a steel tube having a small outside diameter and a large wall thickness, the tube having on at least one surface a hardened layer formed by a diffusion layer which comprises a solid solution of nitrogen, and which is free of metallic compounds i.e. Fe$_3$N and Fe$_4$N.

A diffusion layer comprising a solid solution of nitrogen is formed on at least inner wall surface of a steel tube by Tufftriding in a molten bath of sodium cyanide, while axially vibrating in the tube. Then, the tube is heat treated in a gaseous atmosphere gas, whereby any metallic compound is decomposed and removed from the diffusion layer, and the diffusion layer is grown into a hardened layer.

Embodiments of the present invention will now be described by way of example with reference to the accompanying drawings of which:

FIG. 1 is an enlarged cross sectional view of a steel tube having a hardened layer on its internal surface;

FIG. 2 is a view similar to FIG. 1, but showing another embodiment of this invention;

FIG. 3 is a microphotograph of 200 magnifications showing a cross-section of the internal surface of the tube shown in FIG. 1 after Tufftriding; and FIG. 4 is a microphotograph similar to FIG. 3, but showing the cross section of the internal surface after heat treatment.

FIG. 1 shows a steel tube 1 having a hardened layer 5 on its internal surface 3. To produce the tube shown in FIG. 1, the external surface 2 of the tube is first treated to resist nitriding (antinitriding) which may, for example, comprise plating the external surface 2 with nickel, or the like, and the tube is then, immersed in a molten bath of sodium cyanide at a temperature of 570° C. to 580° C., and while immersed is axially vibrated. This so-called Tufftriding treatment forms on the internal surface 3 of the tube, a diffusion layer 4 comprising a solid solution of nitrogen. FIG. 3 is a microphotograph showing the cross section, after Tufftriding, of the internal surface of the tube in the region indicated by a rectangle in FIG. 1. The tube 1 is then heat treated in a gaseous atmosphere of, for example, nitrogen, having a temperature of, say, 600° C. to 750° C., whereby a brittle layer of a metallic compound, such as Fe$_3$N or Fe$_4$N, formed on the diffusion layer 4 during the Tufftriding treatment is decomposed and removed therefrom. The diffusion layer 4, is thus, grown into a hardened layer 5 having a hardness of, say, Hv 200 to 260. FIG. 4 is a microphotograph showing the cross section of the internal surface, after heat treatment, of the tube in the same region as is shown in FIG. 3.

FIG. 2 shows a steel tube 1 having hardened layers 5 and 5' on both of its internal and external surfaces 3 and 2. The hardened layers 5 and 5' are formed by a method similar to the described above, except that no antinitriding treatment is given to the outer wall surface 2 of the tube. Diffusion layers 4 and 4' are formed on both of the internal and external surfaces 3 and 2, and grown into the hardened layers 5 and 5', respectively.

Axially vibrating the tube during Tufftriding facilitates filling of the small diameter tube bore with molten sodium cyanide along its entire length, so that a uniform diffusion layer may be formed on at least the internal surface of the tube to protect it, in use, against erosion by a fluid flowing therethrough. The subsequent heat treatment provides at least the internal surface of the tube with a uniform hardened layer having superior mechanical properties, i.e. a yield point of, say 35 to 40 kg/mm$^2$ and a tensile strength of, say, 42 to 48 kg/mm$^2$. The tube has remarkably improved fatigue strength without formation of hair cracks in the surface of the tube even when it is bent to form a desired shape.

Two specific examples according to the invention, are described below:

EXAMPLE 1

A tube made of a steel known as STS 35, and having an outside diameter of 6.2 mm, a wall thickness of 2.1 mm and a length of 600 mm, was Tufftrided for 50 minutes in a molten bath of sodium cyanide having a temperature of 570° C., while being axially vibrated at a frequency of 5 Hz and an amplitude of 5 mm by a vibrator made by Usui Kakusai Sangyo K.K., Japan. The tube was, then, heat treated at 720° C. in a furnace filled with nitrogen gas for 30 minutes. A diffusion layer having a depth of 0.3 mm was formed on each of the internal and external tube surfaces. The resulting tube exhibited a hardness of Hv 240, a yield point of 39.2 kg/mm$^2$ and a tensile strength of 46.1 kg/mm$^2$.

EXAMPLE 2

An antinitriding film of nickel having a thickness of five microns was plated on the outer wall surface of a tube STS 35 steel having an outside diameter of 15.00 mm, a wall thickness of 5.5 mm and a length of 1,100 mm. The tube was Tufftrided in a molten bath of sodium cyanide having a temperature of 570° C. for 90 minutes, while being axially vibrated at a frequency of 3 Hz and an amplitude of 2 mm by the same vibrator as used in Example 1. Then, the tube was heat treated for 50 minutes at 650° C. in a furnace filled under a mixed gas atmosphere containing 28% $H_2$, 22% CO and 2% $CO_2$, the balance being nitogen. As a result, a diffusion layer having a depth of 0.4 mm, a hardness of Hv 220, a yield point of 36.8 kg/mm$^2$ and a tensile strength 43.6 kg/mm$^2$ was formed only in the internal surface of the tube.

I claim:

1. A method of manufacturing a steel tube having a small outside diameter and a large wall thickness, and a hardened layer on at least one surface, comprising the steps of Tufftriding a steel tube in a molten bath of sodium cyanide while the tube is being axially vibrated, whereby a diffusion layer comprising a solid solution of nitrogen is formed on at least one surface of the tube; and heat treating the tube in a gaseous atmosphere to decompose any intermetallic compound formed on the diffusion layer by the Tufftriding, whereby a hardened layer is formed on the said surface.

2. A method according to claim 1, wherein an antinitriding treatment is applied to the external surface of the tube whereby the hardened layer is formed only on the internal surface of the tube.

3. A method according to claim 2, wherein the antinitriding treatment comprises plating the external tube surface with nickel.

4. A method according to any one of claims 1 to 3, wherein the gaseous atmosphere is composed at least mainly of nitrogen.

* * * * *